Sept. 13, 1960 T. BARDEEN 2,952,833
MONITORING SYSTEM FOR SEISMOGRAPH FILTERS
Filed Nov. 14, 1955 2 Sheets-Sheet 1
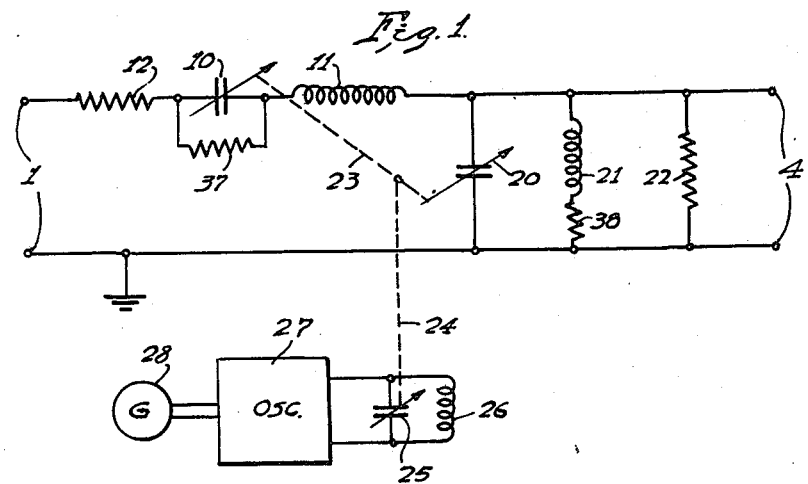
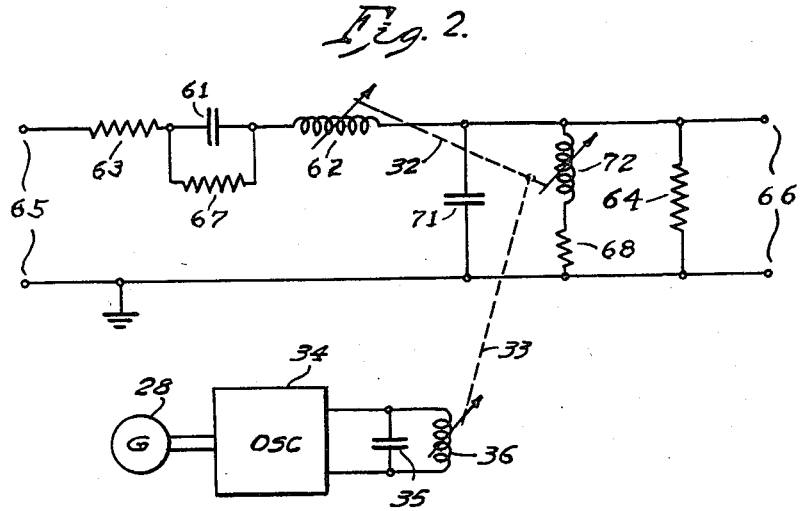
INVENTOR.
*Thomas Bardeen.*
BY
*[signature]*
ATTORNEYS

United States Patent Office 2,952,833
Patented Sept. 13, 1960

---

2,952,833

MONITORING SYSTEM FOR SEISMOGRAPH FILTERS

Thomas Bardeen, Fox Chapel, Pa., assignor to Gulf Research & Development Company, Pittsburgh, Pa., a corporation of Delaware Filed Nov. 14, 1955, Ser. No. 546,707

4 Claims. (Cl. 340—15)

This invention relates to seismograph prospecting apparatus, and in particular concerns seismograph prospecting amplifier filter systems which are adjustable and whose instantaneous adjustment is recorded.

Certain aspects of this invention are disclosed and claimed in copending application Serial No. 546,706, now Patent No. 2,867,779 assigned to the same assignee as the present application.

In seismograph prospecting, a charge of explosive is fired so as to produce earth tremors which are observed at one or more points spaced from the explosive source of earth vibration. In the so-called reflection shooting type of operation the wave energy from the source penetrates downwardly into the earth and is reflected from underground strata, interfaces, fault planes, etc. The pulses received at the observing positions are converted into electrical energy by means of a geophone, and the electrical signals are amplified and recorded for subsequent analysis and interpretation. Due to the fact that the reflected impulses undergo considerable attenuation in the course of their travel from the source down to the reflecting horizon and up to the geophone, their amplitude is oftentimes not far greater than the background noise level. The noise level arises from near-surface disturbances caused directly or indirectly by the shot, or from more or less continuous background noise due to wind, traffic, and other natural and artificial causes.

It is well known to employ filters in seismograph amplifiers to improve the reflection signal-to-noise ratio. It has been found from common experience that reflections from various horizons at different parts of the earth have certain characteristic frequencies, usually lying in the range 15 to 80 cycles per second. Accordingly, seismograph filters have been made adjustable so that the operator may conveniently set the filter to an optimum value in this range to record the desired reflections. It has also been found convenient to employ a band-pass type of filter.

Due to the low frequency of seismograph operations, filter components are commonly adjusted by switching, i.e., by switching more or less condensers in circuit, or by switching taps on the inductance coils in circuit. Usually there are two or more such components to be switched and this requires multiple switching.

In using seismograph filter circuits the operator must compute the recorded reflection frequency, and must know the characteristics or have calibration curves of the various filters at his disposal. This a time-consuming operation and in field operations it is more generally done simply by estimation rather than taking valuable crew time to make the necessary computations. Loss of record quality results from poor matching of filter frequency to the reflection frequency. Furthermore, the operator may fail to note the filter adjustment or improperly set switches and this may lead to serious phase-shift errors in interpreting the recorded seismograms. These phase-shift errors may give rise to erroneous computed profiles or may cause the loss of a valuable structure.

It is the object of this invention to provide a seismograph recording system with an adjustable filter circuit whose frequency adjustment is continuously monitored and recorded.

This and other useful objects of this invention are accomplished as described in this specification, of which the drawings form a part, and in which Figure 1 is a wiring diagram of a filter circuit of this invention employing adjustable capacities;

Figure 2 is a wiring diagram of a filter circuit of this invention employing adjustable inductances;

Figure 3:
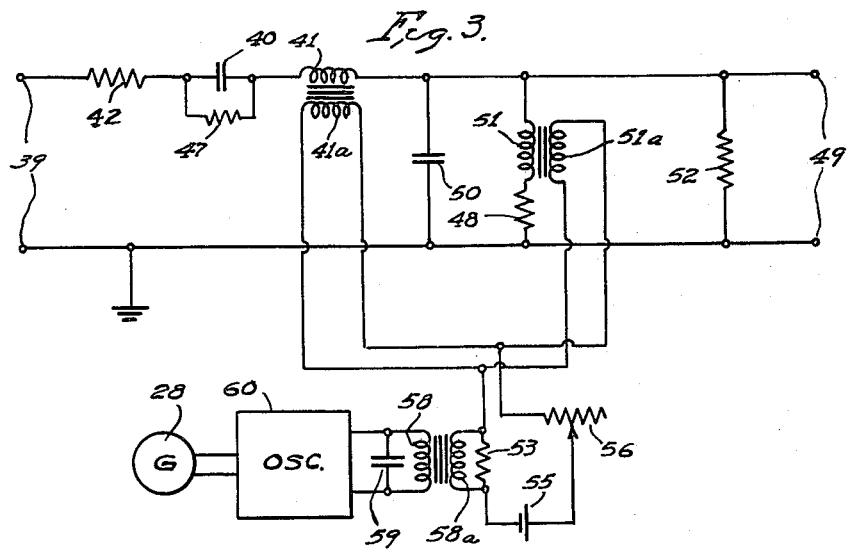
Figure 3 is a wiring diagram of a filter circuit of this invention employing continuously variable inductances.

Referring to Figure 1 there is shown a band-pass filter unit comprising series-tuned condenser 10 and inductance 11, together with parallel-tuned condenser 20 and inductance 21. The usual terminating resistors for a band-pass filter of this type comprise resistor 12 in series with the series-tuned elements, and resistor 22 in parallel with the parallel-tuned elements. Input to the filter is applied at terminals 1 and output is delivered at terminals 4. In order to adjust the midfrequency of the band-pass filter of the type shown, condensers 10 and 20 may be made adjustable and these adjustments must be made simultaneously in such manner as to maintain both the series-connected circuit and the parallel-connected circuit tuned to the midfrequency. Due to the low frequency employed in seismograph recording the adjustments to condensers 10 and 20 must be made by switching in or out of circuit additional capacity, and inasmuch as the adjustments must be made simultaneously the switches must be mechanically interconnected as shown by the dotted line 23. The function of resistors 37 and 38 shown in Figure 1 is to maintain the shape of the transmission characteristic of the filter independent of its midfrequency adjustment as described and claimed in copending application Serial No. 546,706.

In order to provide the operator and the interpreter who subsequently analyzes the seismogram with evidence of the midfrequency to which the seismograph amplifier is set during the recording, the mechanical connection 23 also extends to a condenser 25 as shown by slotted line 24. The condenser 25, together with inductance 26 connected to it, forms the tank circuit of an oscillator 27. The oscillator 27 may be any known type of small electronic oscillator, and the adjustments made to condenser 25 are such that the oscillator oscillates at the same frequency as the midfrequency to which the filter is adjusted. The output wave signal of the oscillator 27 is fed to one of the galvanometers 28 of the seismograph recorder and records on the seismogram as an oscillating trace whose frequency shows the filter frequency used for that recording.

Figure 4:
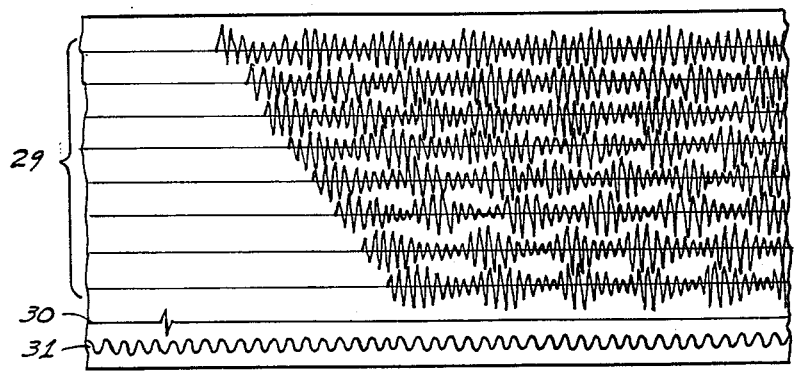
Figure 4 shows an example of a seismograph prospecting record made with this invention.

Figure 4 shows a typical seismograph prospecting record on which is recorded the output of a number of seismograph recording channels by traces indicated by bracket 29 and a shot moment trace 30 as is conventional in the seismograph prospecting art. Timing lines are also commonly placed on a seismograph record of this type but have been omitted from Figure 4 in the interest of clarity. The record shown in Figure 4 also has a trace 31 which is the wave signal produced by the oscillator 27 and recorded by the galvanometer 28 and the frequency of trace 31 is the midfrequency of the filter setting. It is apparent that with the trace 31 close at hand, the operator may observe on any of the traces 29 whether or not the reflection frequency corresponds to the filter frequency, and if not, he may readily see whether the filter frequency should be raised or lowered to bring the two into correspondence. Furthermore, the interpreter when computing the record, has before him unequivocal evidence of the filter frequency used in making the record.

Figure 2 shows an embodiment of the invention wherein a band-pass type of filter circuit is adjusted by adjusting the inductances. The circuit comprises a series-tuned condenser 61 and inductance 62, together with parallel-tuned condenser 71 and inductance 72. The resistors 63 and 64 are connected as shown, input to the filter being at terminals 65 and output at terminals 66. The function of resistors 67 and 68 shown in Figure 2 is to maintain the shape of the transmission characteristic of the filter independent of its midfrequency adjustment as described and claimed in copending application Serial No. 546,706. The inductance adjustment is made by changing taps on the coil and the tap-changing switches are mechanically interconnected by the connection 32 which also has a further mechanical connection 33 to change taps on the inductance 36. The inductance 36, together with condenser 35 connected to it, forms the tank circuit of oscillator 34 whose frequency tracks the filter's midfrequency and whose output is recorded by galvanometer 28. In this manner the embodiment of Figure 2 provides a record in all respects similar to that of Figure 4 previously described.

Inasmuch as a change in capacity in an oscillating circuit has the same effect as a change in inductance, it is possible to devise the mechanical connection 24 of Figure 1 so that instead of changing the adjustment of condenser 25, it changes the adjustment of an adjustable inductance (not shown) connected in place of inductance 26. In such case the mechanical connection 24 must be such that an increase in capacity of condensers 19 and 20 effects a corresponding increase of inductance so that the oscillator frequency tracks the filter adjustment. Similarly in Figure 2 it is possible to devise the mechanical connection 33 so that instead of changing the adjustment of inductance 36, it changes the adjustment of an adjustable condenser (not shown) connected in place of condenser 35.

Figure 3 shows a schematic wiring diagram of a band-pass filter circuit of a type similar to that shown in Figures 1 and 2, but in which frequency adjustment is accomplished by varying the inductances in a manner which permits a high degree of flexibility and which avoids the difficulties of multiple switching. The band-pass filter comprises series-tuned condenser 40 and adjustable inductance 41 together with parallel-tuned condenser 50 and adjustable inductance 51. Input and output terminals are 39 and 49 respectively and the resistors 42 and 52 are connected as shown. The function of resistors 47 and 48 shown in Figure 3 is to maintain the shape of the transmission characteristic of the filter independent of its midfrequency adjustment as described and claimed in copending application Serial No. 546,706.

The inductances 41 and 51 of Figure 3 are of the saturable-core type and the respective cores of these inductances are provided with control windings 41a and 51a respectively. By passing a D.-C. current through the windings 41a and 51a it is possible to vary the flux density in the core of the respective inductance and in this manner control the incremental permeability of the core at the operating point. Inasmuch as the incremental permeability decreases with an increase in flux density, it is thus possible to control the inductances 41 and 51. In order to prevent transfer of energy from the coil 41 to the coil 41a and from coil 51 to coil 51a, each respective inductance is actually formed of a pair of inductances connected in series opposition with respect to a common control coil, i.e. a humbucking connection is employed. The control windings 41a and 51a are connected in parallel to a battery 55 through variable resistor 56. By adjusting the resistor 56 one may adjust the currents in the coils 41a and 51a and in this manner control the midfrequency adjustment of the filter unit. The reactors 41 and 51 preferably have similar core characteristics so that by adjusting the resistor 56 the proper current is passed through the respective coils 41a and 51a in order to maintain the desired degree of tuning for the series-tuned circuit 40 and 41, as well as for the parallel-tuned circuit 50 and 51.

The current supplied to the control circuit is also passed through a control winding 58a of a saturable-core reactor 58 which together with condenser 59 connected to it, forms a tank circuit of oscillator 60. In this manner, as the midfrequency of the filter unit is varied by changing the current in the coils 41a and 51a, a similar change is made in the inductance 58, so that the frequency of oscillator 60 is the same as the midfrequency of the filter unit. The control coil 58a of the oscillator may be shunted by a resistor 53 which is of such value to bring the oscillator frequency into correspondence with the filter midfrequency. A galvanometer 28 is connected to the output of oscillator 60 and records the frequency on the seismogram as a trace similar to trace 31 of Figure 4.

It is apparent that with the circuit of Figure 3 the midfrequency of the filter may be varied in a smooth and continuous manner over the entire range of adjustment and the trace 31 indicates at any instant the frequency to which the filter is set. This attribute of Figure 3 is particularly advantageous in that the frequency of the filter may be varied as desired during the course of a seismograph recording. The time variation may be effected by simply controlling the resistor 56 with time in the desired manner by mechanical means (not shown). Alternatively, the current in coils 41a, 51a, and 58a, may be varied by discharging a condenser through them.

For any type of frequency variation as a function of time which may be employed, the trace 31 always indicates the instantaneous frequency setting of the filter. It is thus possible for the operator to arrange the time variation of filter adjustment so that the filter frequency will fit a reflection of one frequency during the early part of the record and vary so as to fit another reflection of another frequency in a later part of the record. Such adjustments can easily be made by observing the trace 31 showing the instantaneous filter adjustment and comparing it with the reflection frequency as it appears on the recorded traces 29 of Figure 4. This feature of the invention is extremely useful in seismograph prospecting apparatus employing filters whose frequency setting is varied during the course of the record. When using the embodiment of Figure 3 in this manner, the trace 31 of Figure 4 will of course have a varying frequency (not shown in Figure 4). Besides providing the operator with necessary information so that he can properly adjust the filter and its variation with time, the trace 31 also gives the interpreter information as to the instantaneous filter setting at every instant during the recording of the seismogram.

I claim:

1. A seismograph recording system comprising an adjustable seismic filter, means for recording on a record medium seismic events whose signals pass through said filter, means for adjusting the frequency response characteristic of said filter, an electric oscillator, means for adjusting the frequency of said oscillator, means interconnecting said filter-frequency-adjusting means and said oscillator-frequency-adjusting means to simultaneously vary both said means in the same manner, and means for recording on the same record medium at least the peaks of one polarity of the instantaneous wave form of said oscillator output.

2. A seismograph recording system comprising an electrical filter through which seismic signals are passed, means for electrically adjusting the frequency response characteristics of said filter, means for recording on a record medium seismic events whose signals pass through said filter, an electric oscillator, means for electrically adjusting the frequency of said oscillator, electric circuit means interconnecting said filter-frequency-adjusting means and said oscillator-frequency-adjusting means, and means for recording on the same record medium simultaneously with the recording of seismic events at least the peaks of one polarity of the instantaneous wave form of said oscillator output.

3. In a seismograph recording system adapted to produce a seismic record and including an electrical filter having means for varying the frequency response characteristic thereof, the improvement which comprises an electric oscillator, means connected to said oscillator for adjusting the frequency thereof, means connecting said oscillator-frequency-adjusting means to the frequency-response-characteristic-adjusting means of the filter in such manner that the oscillator frequency is adjusted to coincide with the mid-frequency of the filter characteristic, and means for recording on the seismic record at least the peaks of one polarity of the instantaneous wave form of said oscillator output.

4. In a seismograph recording system adapted to produce a seismic record and including an electrical filter having means for continuously varying the frequency response characteristic thereof, the improvement which comprises an electric oscillator, means connected to said oscillator for continuously adjusting the frequency thereof, means connecting said oscillator-frequency-adjusting means to the frequency-response-characteristic-adjusting means of the filter in such manner that the oscillator frequency is adjusted to continuously coincide with the mid-frequency of the filter characteristic, and means for continuously recording on the seismic record at least the peaks of one polarity of the instantaneous wave form of said oscillator output.

References Cited in the file of this patent

UNITED STATES PATENTS

| | | |
|---|---|---|
| 1,909,940 | Farnham | May 23, 1933 |
| 2,245,717 | Roberts | June 17, 1941 |
| 2,272,201 | Hoover | Feb. 10, 1942 |
| 2,272,768 | Crosby | Feb. 10, 1942 |
| 2,330,216 | Hoover et al. | Sept. 28, 1943 |
| 2,392,758 | Minton | Jan. 8, 1946 |
| 2,420,672 | Maillet | May 20, 1947 |
| 2,424,705 | Parr | July 29, 1947 |
| 2,493,534 | Hawkins | Jan. 3, 1950 |
| 2,630,367 | Rahmel | Mar. 3, 1953 |
| 2,683,253 | Desenfant | July 6, 1954 |
| 2,725,534 | Hemphill | Nov. 29, 1955 |